(12) United States Patent
Bang

(10) Patent No.: US 9,182,901 B2
(45) Date of Patent: Nov. 10, 2015

(54) MOBILE TERMINAL AND CONTROL METHOD THEREOF

(71) Applicant: LG ELECTRONICS INC., Seoul (KR)

(72) Inventor: Kisoo Bang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 13/714,721

(22) Filed: Dec. 14, 2012

(65) Prior Publication Data

US 2013/0179784 A1 Jul. 11, 2013

(30) Foreign Application Priority Data

Jan. 10, 2012 (KR) ........................ 10-2012-0002879

(51) Int. Cl.
```
G06F 3/00      (2006.01)
G06F 3/0488    (2013.01)
H04M 1/60      (2006.01)
H04M 19/04     (2006.01)
H04M 1/725     (2006.01)
```
(52) U.S. Cl.
CPC ........... *G06F 3/0488* (2013.01); *H04M 1/6066* (2013.01); *H04M 19/04* (2013.01); *H04M 1/72558* (2013.01)

(58) Field of Classification Search
USPC .................................. 715/716, 727, 728, 862
See application file for complete search history.

(56) References Cited

U.S. PATENT DOCUMENTS

| | | | |
|---|---|---|---|
| 8,768,494 B1* | 7/2014 | Stroud et al. | 700/94 |
| 2008/0092110 A1* | 4/2008 | Kawahara et al. | 717/105 |
| 2008/0160979 A1* | 7/2008 | Huang | 455/418 |
| 2012/0110452 A1* | 5/2012 | Hiipakka et al. | 715/716 |
| 2012/0137231 A1* | 5/2012 | Maxfield et al. | 715/753 |

OTHER PUBLICATIONS

Stephen J. Elliott et al.; "A Multiple Error LMS Algorithm and Its Application to the Active Control of Sound and Vibration" Oct. 1987; IEEE Transactions on Acoustics, Speech, and Signal Processing, vol. ASSP-3 No. 10.*

Yusuke Takeno at al.; "Automatic Control of Airship by Detection for Sound Source Direction with Microphones" Oct. 18-21, 2006; SICE-ICASE International Joint Conference 2006.*

* cited by examiner

*Primary Examiner* — Linh K Pham
*Assistant Examiner* — Tam Tran
(74) *Attorney, Agent, or Firm* — Lee, Hong, Degerman, Kang & Waimey

(57) ABSTRACT

A mobile terminal and a control method thereof are disclosed. The mobile terminal includes: a memory configured to store a plurality of sound sources; an output unit comprising an audio output module; and a controller configured to control the output of sound sources comprising at least another one of the plurality of sound sources, based on a specific event acquired when at least one of the plurality of sound sources is output to the audio output module or on standby for output. Accordingly, the output of a plurality of sound sources can be easily controlled.

19 Claims, 32 Drawing Sheets

Relative shares (a)

Relative shares (b)

(a)

(b)

(a)

(b)

(a)

(b)

(a)

(b)

(a)

(b)

(a)

(b)

(a)

(b)

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0002879, filed on Jan. 10, 2012, the contents of which are hereby incorporated by reference herein in their entirety.

TECHNICAL FIELD

The present invention relates to a mobile terminal, and more particularly, to a mobile terminal capable of easily controlling the output of a plurality of sound sources and a control method thereof.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

Therefore, the necessity of controlling the output of a plurality of sound sources during playback of a variety of multimedia files is increasing more and more.

SUMMARY

The present invention relates to a mobile terminal capable of easily controlling the output of a plurality of sound sources and a control method thereof.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
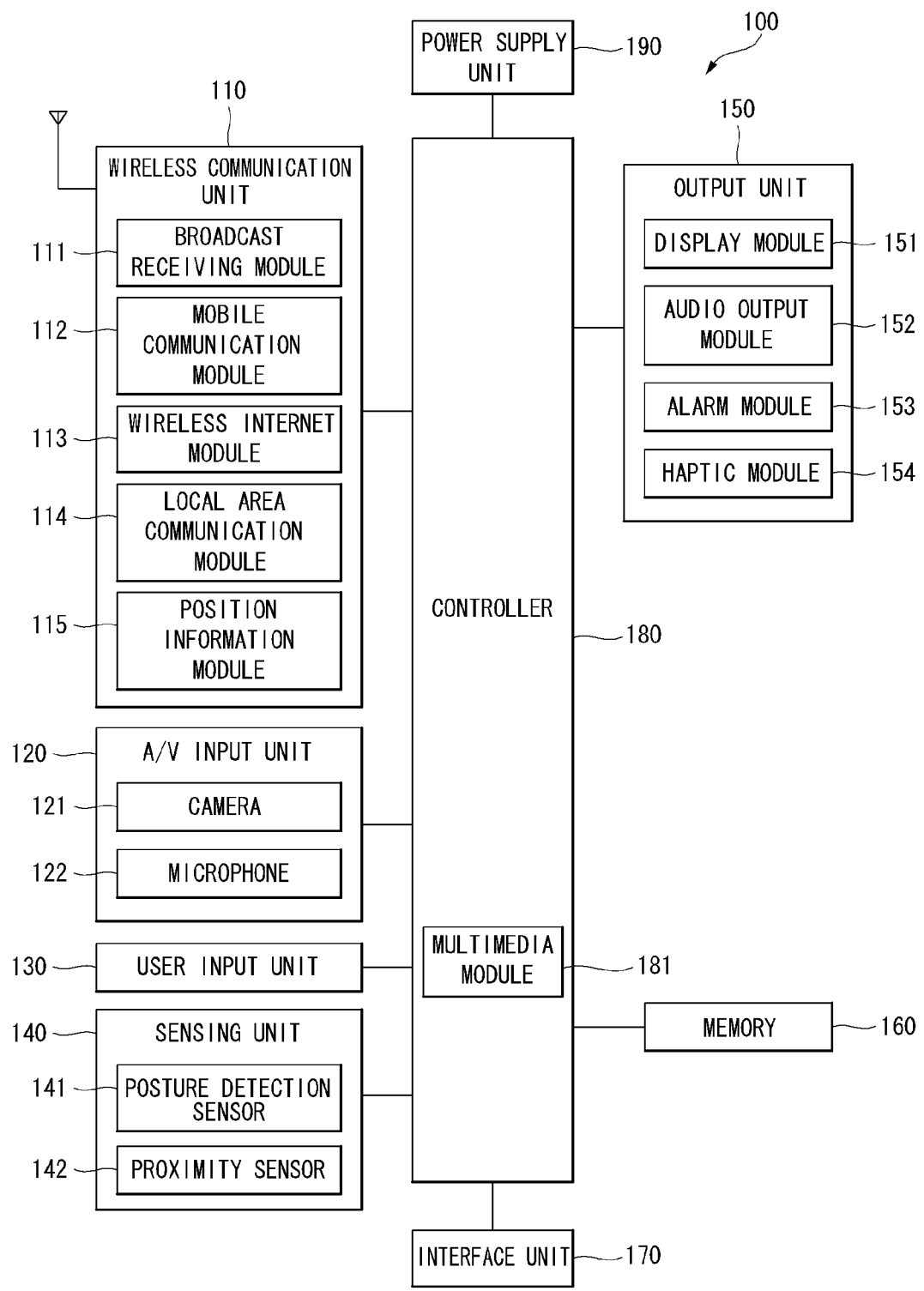
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
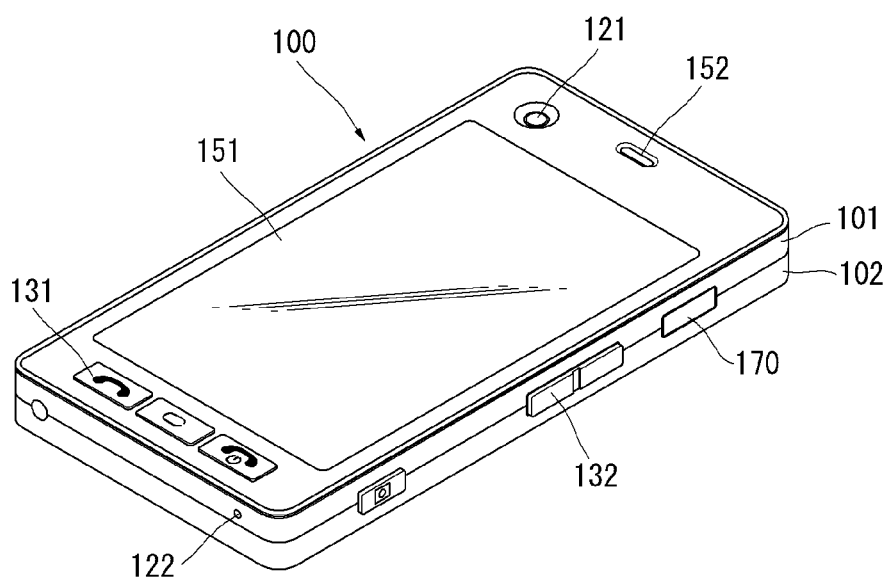
FIG. 2 is a front perspective view of the mobile terminal according to an embodiment.

FIG. 2 is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 3:
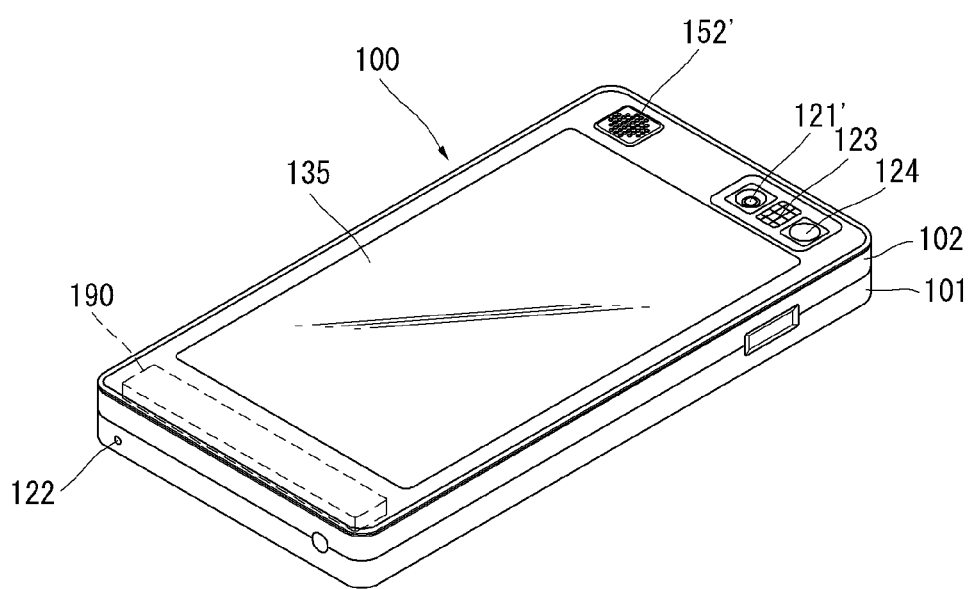
FIG. 3 is a rear perspective view of the mobile terminal according to an embodiment.

FIG. 3 is a rear perspective view of the mobile terminal (shown in FIG. 2) according to an embodiment.

Referring to FIG. 2, a camera 121' may be additionally attached to the rear side of the terminal body (i.e., the rear case 102). The camera 121' may have a photographing direction opposite to that of the camera 121 (shown in FIG. 2) and may have pixels different from those of the camera 121 (shown in FIG. 2).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 4:
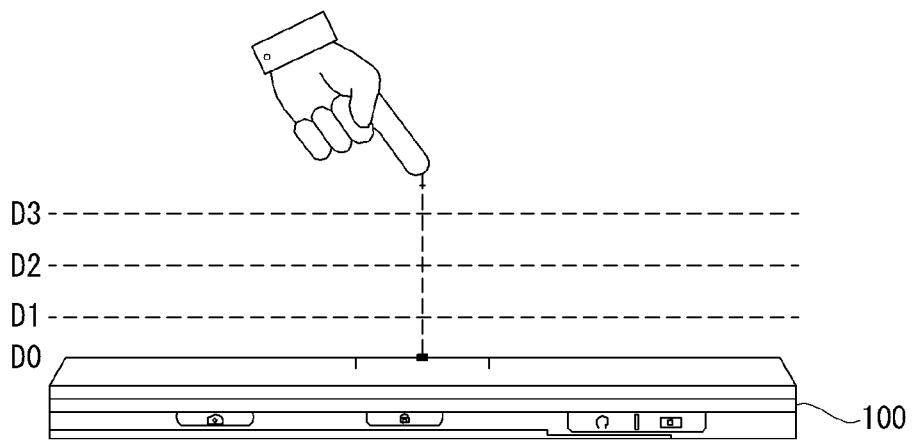
FIG. 4 is a view for explaining a proximity depth of a proximity sensor.

FIG. 4 is a view for explaining a proximity depth of a proximity sensor.

As shown in FIG. 4, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 4 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 5:
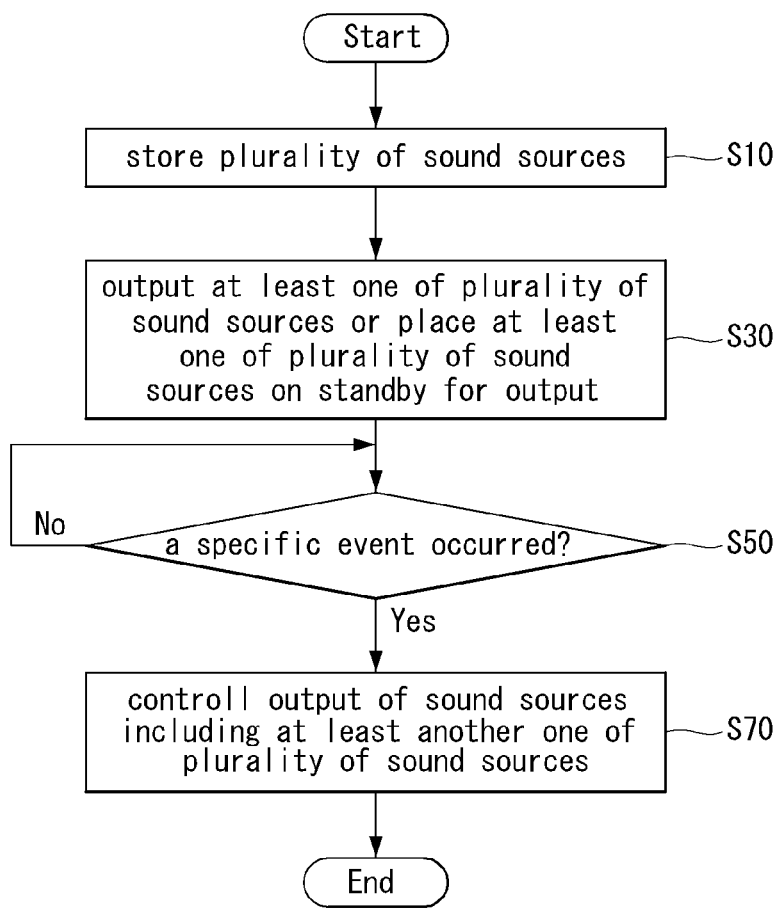
FIG. 5 is a flowchart showing an operation of the mobile terminal of FIG. 1.

FIG. 5 is a flowchart showing an operation of the mobile terminal of FIG. 1.

As shown therein, the controller 180 of the mobile terminal 100 according to example embodiment of the present invention may perform the step S10 of storing a plurality of sound sources.

The sound sources may include various types of content for which sound is output through the audio output module 152 of the mobile terminal 100. The sound sources may include sources, such as video, containing audio and images, as well as sources, such as MP3, containing only audio. That is, the sound source is a term which encompasses any content for which sound is outputted, regardless of a particular format.

Sound sources may be acquired through various channels. For example, they may be stored in the mobile terminal 100 in the stage of production of the mobile terminal 100, or the user may store them in the mobile terminal 100. The mobile terminal may acquire sound sources in a wired and/or wireless manner.

A plurality of sound sources may be stored. This means that a plurality of sound sources may exist. Examples of the sound sources may include sound sources contained in various types of content, such as a navigation system, TTS (Text-To-Speech), video calling, games, etc and sound sources, such as alarm sounds, ringtones, message received sounds, etc, used for the system of the mobile terminal 100. The plurality of sound sources may be output at different timings from each other or not. For example, this means that a second sound source may be output to the audio output module 152 while a first sound source is being output to the audio output module 152.

In the case that the plurality of sound sources are output at separate times from each other or not, the output of each sound source may need to be controlled. For example, the user may want to listen to route guidance from a navigation system loudly but the playback sound of an MP3 file quietly. In this case, such user's needs cannot be met as long as the output volume is the same for all the sound sources. Further, even if the output of each sound source can be controlled, the user's needs cannot be met if the controlling requires a complicated procedure. The mobile terminal 100 according to example embodiment of the present invention can satisfy the user's needs.

The plurality of sound sources may be stored in the memory 160. The memory 160 for storing the plurality of sound sources may be at least one type of memory chosen from a group consisting of a memory for permanently storing data, a memory for semi-permanently storing data, and a memory for temporarily storing data. For example, if a sound source is acquired in a streaming fashion through the wireless internet module 113, the acquired data may be temporarily stored in a buffer memory and then deleted. The memory according to example embodiment of the present invention may include such a buffer memory.

The step S30 of outputting at least one of the plurality of sound sources or placing the sound source on standby for output may be performed.

The plurality of sound sources may be output at the same timing or different timings. For example, the first sound source may be output at a particular timing. Otherwise, although it is not output, the first sound source may be on standby for output at a particular timing. Further, the second sound source may be output or on standby while the first sound source is being output.

A sound source which is output or on standby for output, among the plurality of sound sources, can be considered to be given higher priority than the other sound sources. For example, it can be seen that, in outputting a plurality of sound sources, the controller 180 determines the order by giving priority to a particular sound source. In this case, the controller 180 may control sound sources with the same priority to be simultaneously output.

The step S40 of determining whether a specific event has occurred may be performed.

The specific event may occur by an input from the user of the mobile terminal 100 and/or a control operation of the controller 180.

The specific event may be a user's operation of touching a specific point on the display module 151 of the mobile terminal 100. When the user touches a specific point on the display module 151, the controller 180 may determine that a corresponding specific event has occurred.

The specific event may be an operation of performing a long touch on a specific icon displayed on the display module 151 for a given period of time or longer.

The specific event may be an operation of dragging from a specific point on the display module 151.

The specific event may occur by a control operation of the controller 180 under a specific situation. For example, if a situation occurs where a plurality of sound sources should be output, the controller 180 may determine that the specific event has occurred.

Once the specific event has occurred, the step S70 of controlling the output of sound sources including at least another one of the plurality of sound sources may be performed.

The output of a plurality of sound sources needs to be controlled, respectively. For example, as described above, this means that it is necessary to properly control the output of a first sound source, which is output during an operation of a first application, a second sound source, which is output during an operation of a second application, and a third sound source, which is output by the system of the mobile terminal 100. The mobile terminal 100 according to example embodiment of the present invention may render the output of each of the plurality of sound sources easily controllable.

The controlling of the output of a plurality of sounds sources may be explained according to the order of priority. For example, this means that the output of a sound source with lower priority which is not being output, as well as the output of a sound source with higher priority which is being output, can be controlled as well.

Figure 6:
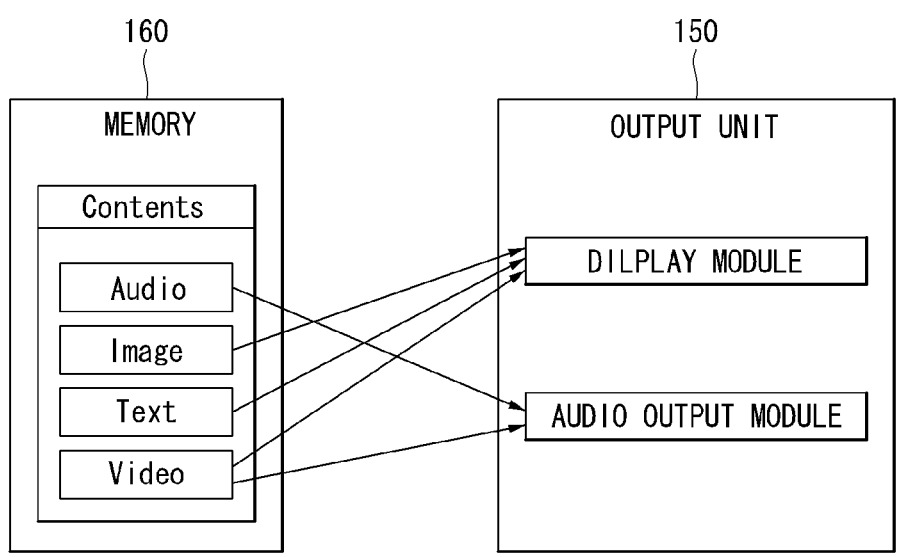
FIG. 6 is a view showing output targets depending on the type of content.

FIG. 6 is a view showing output targets depending on the type of content.

As shown therein, the mobile terminal 100 according to example embodiment of the present invention may output the content stored in the memory 160 to a specific output unit 150.

The content may be stored in various formats. For example, the content may be stored in such a manner as to contain audio, image, text, and video.

The stored content may be output to the output unit 150. The output unit 150 may include the display module 151 for outputting a visible still image and/or moving image and the audio output module 152 for outputting an audible sound source.

The output unit 150 may output content corresponding to the characteristics of each module. For example, audio may be output through the audio output module 152. Images and/or text may be output through the display module 151.

Video may be output to both of the display module 151 and the audio output module 152. That is, images contained in video may be output to the display module 151, and audio contained in video may be output to the audio output module 152.

Figure 7:
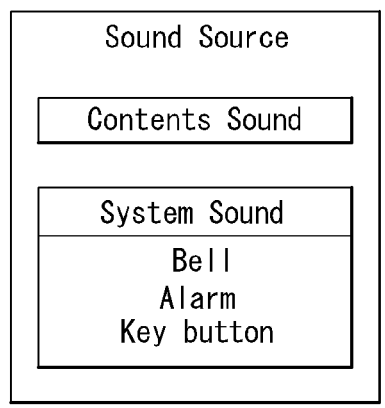
FIG. 7 is a view showing an example of a plurality of sound sources.

FIG. 7 is a view showing an example of a plurality of sound sources.

As shown therein, sound sources associated with an operation of the mobile terminal 100 according to example embodiment of the present invention may include a content sound source and a system sound source.

The content sound source may be a sound source which is output by various kinds of applications operating on the mobile terminal 100. For example, the applications may include an application for playing sound sources of various formats, such as MP3, WAV etc, a navigation application, and a video playback application containing a sound source.

The system sound source may be a sound source which is output during operation of the mobile terminal 100. For example, the system sound source may be a sound source that is output upon receiving a call, a sound source corresponding to an alarm for low battery, a sound source that is output upon selecting a key button, and a sound source that is output during switching on/off of the mobile terminal 100.

The content sound source and the system sound source may be simultaneously output. For example, this means that an alarm for low battery may be output while route guidance is being output from a navigation application.

Figure 8:
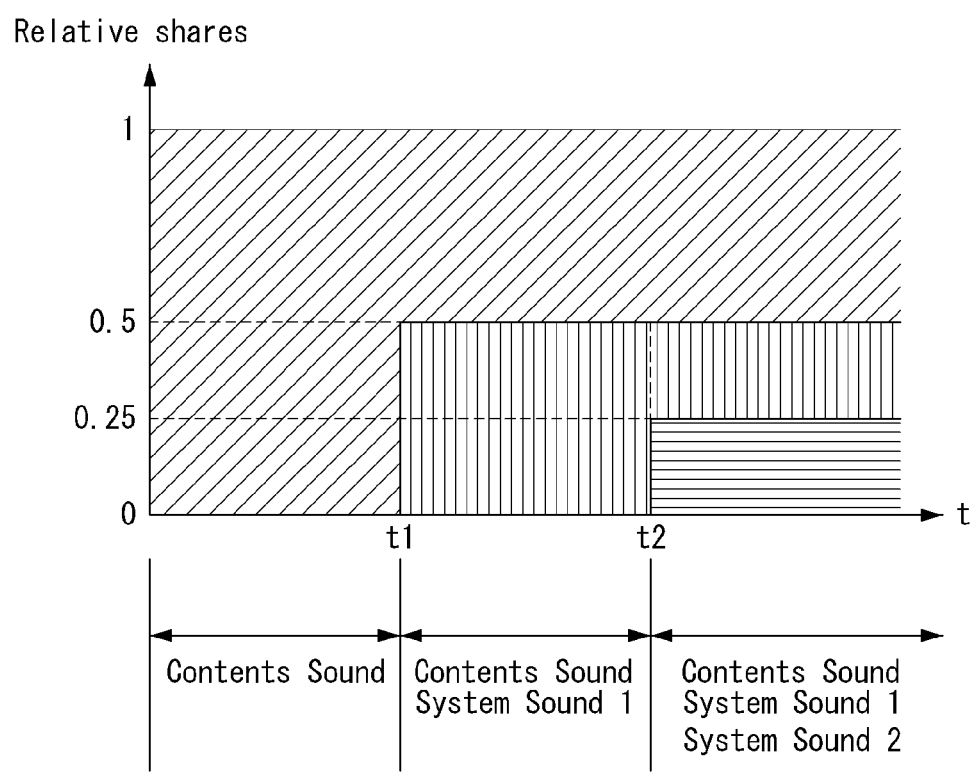
FIG. 8 is a view showing the relative shares between a plurality of sound sources.

FIG. 8 is a view showing the relative shares between a plurality of sound sources.

As shown therein, in the mobile terminal according to example embodiment of the present invention, a plurality of sound sources may be simultaneously output.

Only a content source may be solely output until time t1. This means that a content source is output with a share of 1.

The content sound source and a first system sound source may be simultaneously output from time t1 to time t2. In this case, the content sound source and the first system sound source may be output with a share of 0.5 each. This means that the content sound source and the first system sound source may be substantially output at the same volume.

The content sound source, the first system sound source, and a second system sound source may be simultaneously from time t2 to time t3. In this case, the content sound source may be output with a share of 0.5, and the first and second system sound sources may be output with a share of 0.25 each. This means that the first and second system sound sources may be output at a relatively lower volume than the content sound source. In this state, or before this state, the user of the mobile terminal 100 may want to set up shares between the content sound source and the first and second system sound sources. For example, so long as information of more interest to the user can be output through the second system sound source at a specific timing, the user can control the second system sound source to have a larger share.

Figure 9:
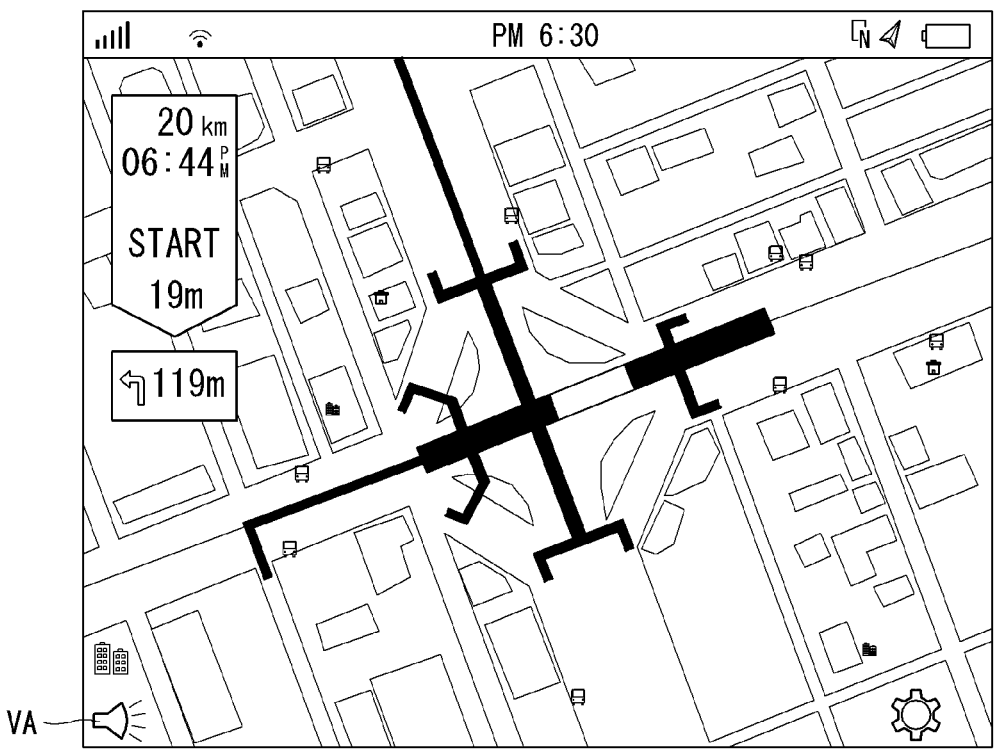
FIG. 9 is a view showing a state according to example embodiment of the present invention.

FIG. 9 is a view showing a mode according to example embodiment of the present invention.

As shown therein, the mobile terminal 100 according to example embodiment of the present invention may output different types of sound sources when an image associated with a specific sound source is on display.

The controller 180 may run a navigation application for route guidance, and display an image associated with the application on the display module 151.

The controller 180 may output a first content sound source associated with the navigation application running in the foreground. For example, this means that route guidance, for example, 'Turn left at the next intersection' may be given.

The controller 180 may run an MP3 playback application, along with the navigation application. For example, this means that music (i.e., the second content sound source) may be played, along with the route guidance by the navigation application.

The controller 180 may output a first system sound source which indicates the fact that the remaining battery power of the mobile terminal 100 does not reach a specific level, during outputting of the first and second content sound sources. Also, the controller 180 may output a second system sound source which indicates an incoming call during outputting of the first and second content sound sources and the first system sound source.

In controlling a plurality of sound sources, the controller 180 may need to adjust the shares between the plurality of sound sources or the volume thereof. As described above, for example, this means that a sound source of information of more interest to the user at a given point in time needs to be controlled to be output more loudly than other sound sources. Further, this controlling should be easily carried out.

Figure 10:
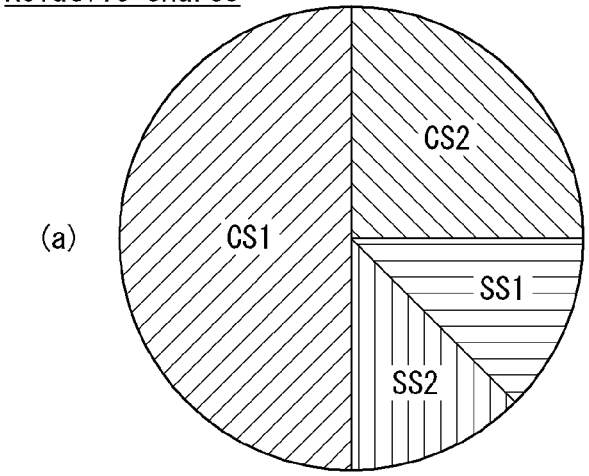
FIG. 10 is a view showing the relative shares between a plurality of sound sources in the mode of FIG. 9.
Figure 10:
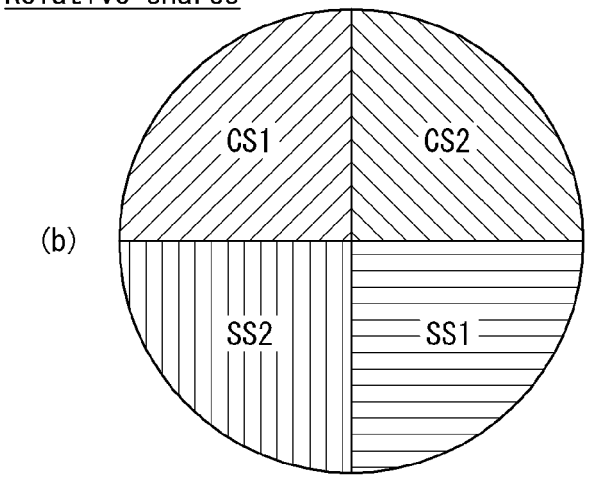

FIG. 10 is a view showing the relative shares between a plurality of sound sources in the mode of FIG. 9.

As shown therein, sound sources output from the mobile terminal 100 according to example embodiment of the present invention may be output with different shares.

As shown in (a) of FIG. 10, the first content sound source CS1 may be output with a share of ½, the second content sound source CS2 may be out put with a share of ¼, and the first and second system sound sources SS1 and SS2 may be output with a share of ⅛ each.

As shown in (b) of FIG. 10, the first and second content sound sources CS1 and CS2 and the first and second system sound sources SS1 and Ss2 may be output with a share of ¼ each.

As shown in (a) and (b) of FIG. 10, the sound sources may be output with different shares. Further, the mobile terminal 100 according to example embodiment of the present invention may selectively adjust the share of each sound source.

Figure 11:
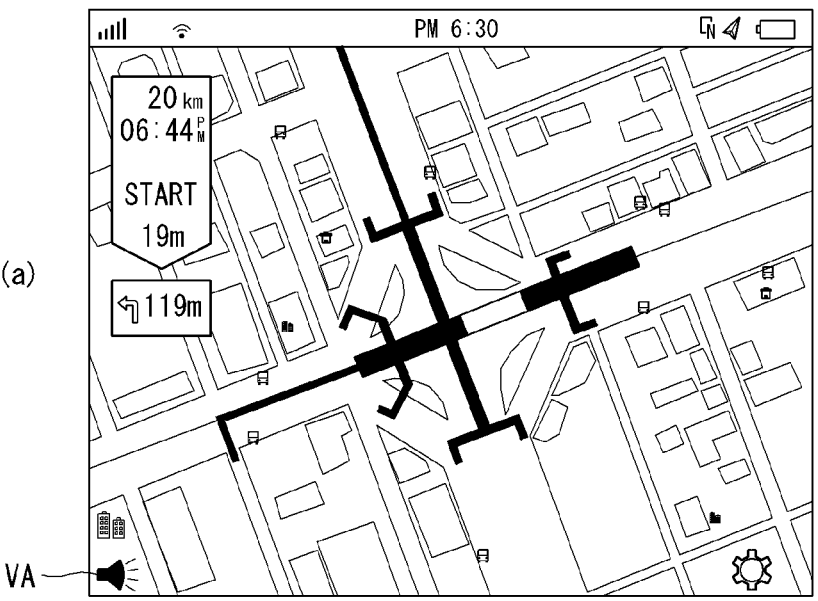
FIGS. 11 and 12 are views showing an operation on a volume control area of FIG. 9.
Figure 11:
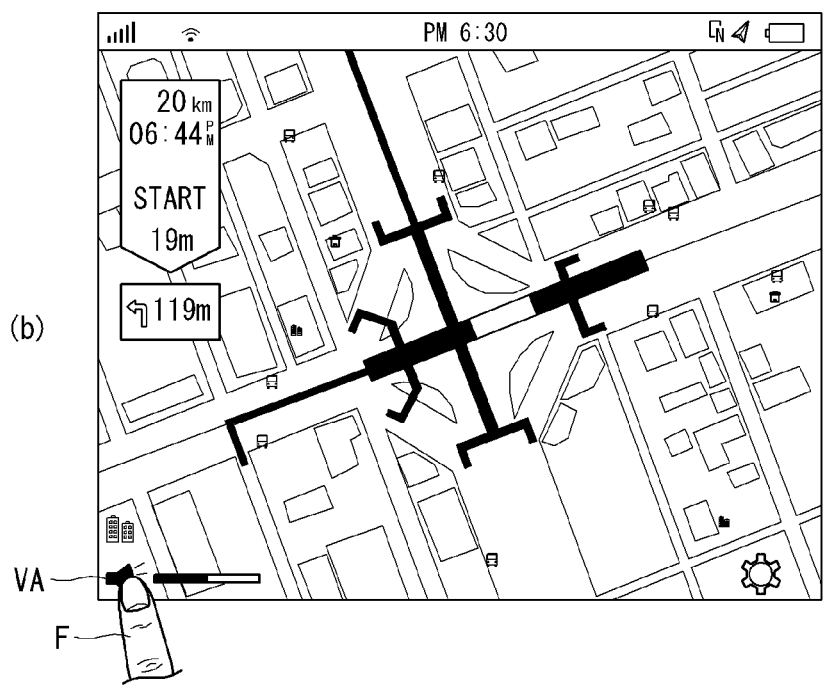
Figure 12:
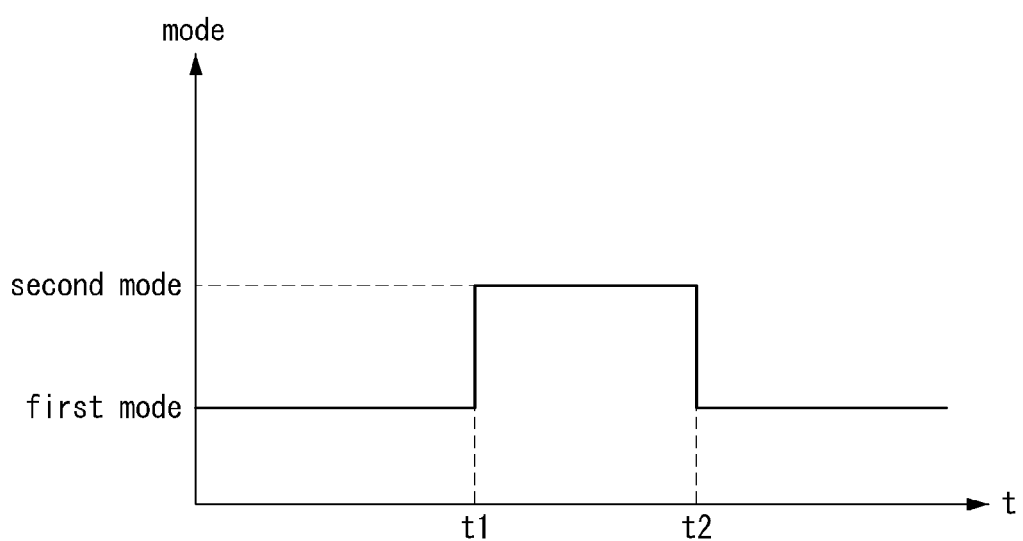

FIGS. 11 and 12 are views showing an operation on a volume control area of FIG. 9.

As shown in these drawings, the controller 180 of the mobile terminal 100 according to example embodiment of the present invention may display a screen for controlling the output of a sound source based on an acquired specific event.

As shown in (a) of FIG. 11, an image corresponding to the navigation application may be displayed on the display module 151. Moreover, a sound source corresponding to the navigation application may be output through the audio output module 152. Further, music of MP3 format may be output through the audio output module 152, or may be on standby for output.

As shown in (b) of FIG. 11, the user may select a volume icon VA of the display module 151 with a finger F. When the volume icon VA is selected, the controller 180 may display a corresponding indicator. The indicator may indicate the volume state of an application running in the foreground. For example, this means that the volume state of the navigation application may be indicated. The user may control the volume of the navigation application by touching the indicator.

The user may perform a long touch on the volume icon VA for a given period of time or longer. When the volume icon VA is long-touched, the controller 180 may change the mode of the mobile terminal 100.

As shown in FIG. 12, a first mode and a second mode may be included in example embodiment of the present invention.

The first mode may indicate that a touch on the volume icon VA continues until time t1. For example, this means that, when the volume icon VA is touched for a while, the indicator for indicating a volume state associated with the application currently being displayed on the display module 151, may be displayed.

The second mode may indicate that a touch on the volume icon VA continues after t1. For example, this means that, when the volume icon VA is long-touched, the mobile terminal 100 may enter into the mode of controlling the output of a sound source including the application currently being displayed on the display module 151. After entering into this mode and performing a related operation, when a predetermined period of time elapses or the user performs a specific operation of terminating the second mode, the controller 180 may return the mobile terminal 100 to the original mode, i.e., the first mode.

Figure 13:
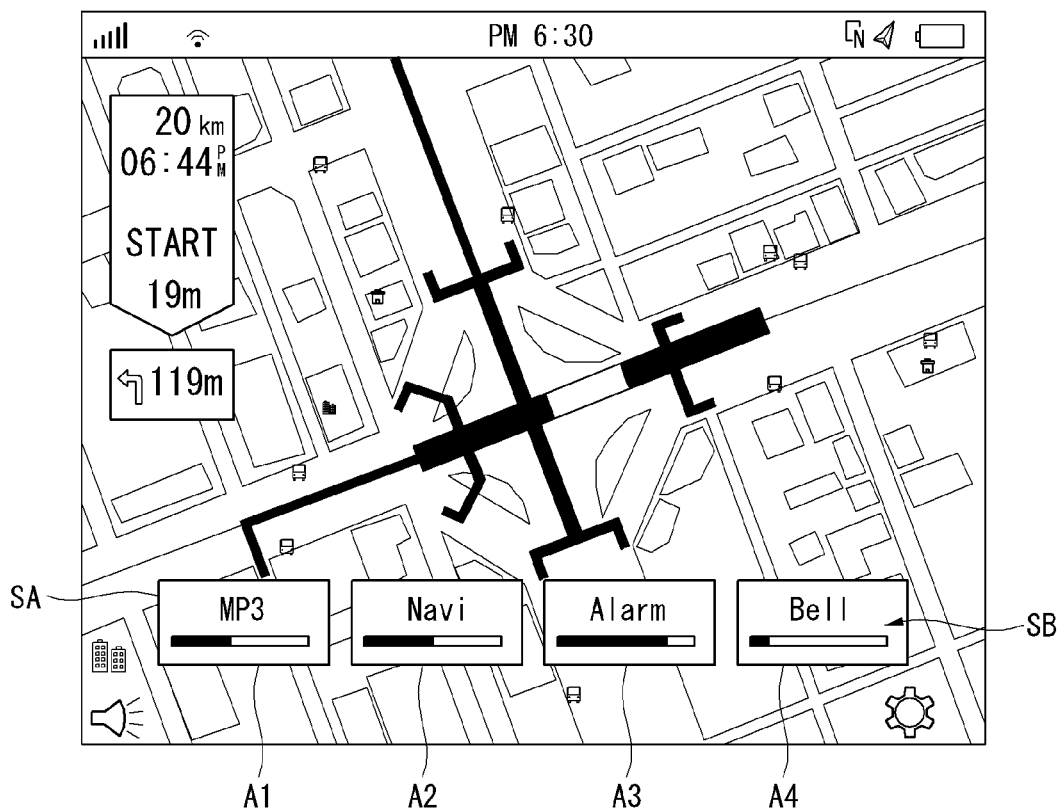
FIG. 13 is a view showing a control window for controlling a plurality of sound sources of the mobile terminal of FIG. 9.

FIG. 13 is a view showing a control window for controlling a plurality of sound sources of the mobile terminal of FIG. 9.

As shown therein, the mobile terminal 100 according to example embodiment of the present invention may enter into the second mode of displaying the control window SA for controlling a plurality of sound sources.

As described above, the mobile terminal may enter into the second mode when an event occurs in which the user performs a long touch on the volume icon VA.

The control window SA may be a screen for controlling the output of a plurality of sound sources which can be output through the mobile terminal 100. For example, the control window SA may include a first area A1 for controlling the volume of an application for outputting an MP3 file, etc, a second area A2 for controlling the volume of a navigation application, a third area A3 for controlling the system volume to indicate the mode of the mobile terminal 100, and a fourth area A4 for controlling the volume of an incoming ringtone.

The first to fourth areas A1 through A4 may include a volume control bar SB. That is, a volume control bar SB may be displayed to selectively control the volume corresponding to each area.

When the volume of a specific area is controlled by means of the volume control bar SB, only the volume corresponding to that area may be controlled without any effect on the volume of the other areas. For example, the user may control the volume of the navigation application without any effect on the volume of ringtone, etc.

Figure 14:
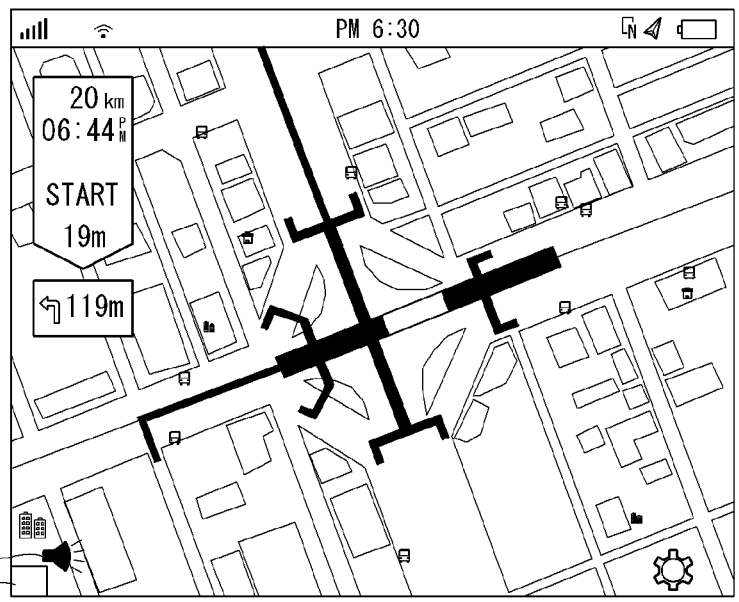
FIG. 14 is a view showing a method of entering into the second mode according to another embodiment of the present invention.
Figure 14:
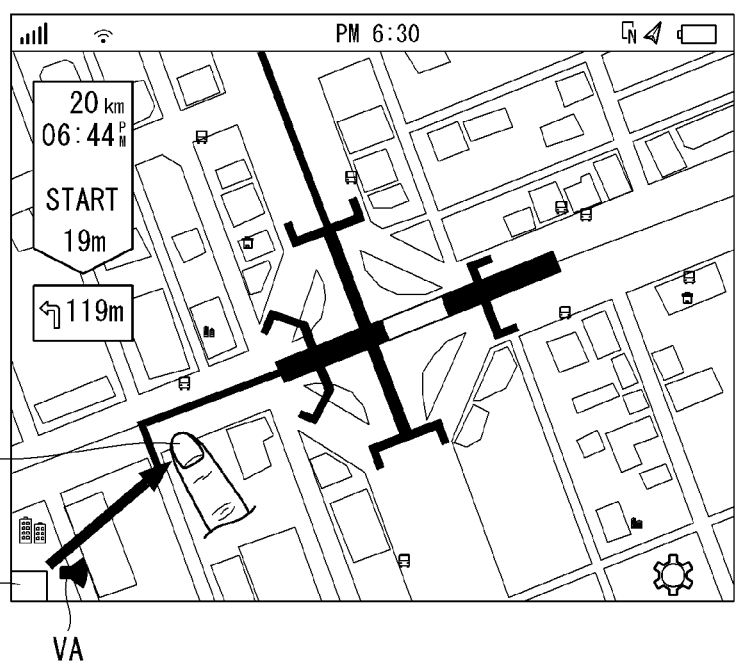

FIG. 14 is a view showing a method of entering into the second mode according to another embodiment of the present invention.

As shown therein, the controller 180 of the mobile terminal according to another embodiment of the present invention may perform the second mode of displaying the control window SA upon receipt of a user's dragging touch input.

As shown in (a) of FIG. 14, a folding area FA may be displayed at a corner of the display module 151. The folding area FA may be an area that looks as if a corner of paper is folded.

The controller 180 may selectively display the folding area FA based on at least either the type or the number of sound sources output from the mobile terminal 100. For example, this means that, if there is a single sound source, the controller 180 may not display the folding area FA, and if there is a plurality of sound sources, it may display the folding area FA.

As shown in (b) of FIG. 14, the user may perform a touch action of dragging a certain distance or longer after touching the folding area FA. When such a touch action is input, the controller 180 may display the second mode of displaying the control window SA.

Figure 15:
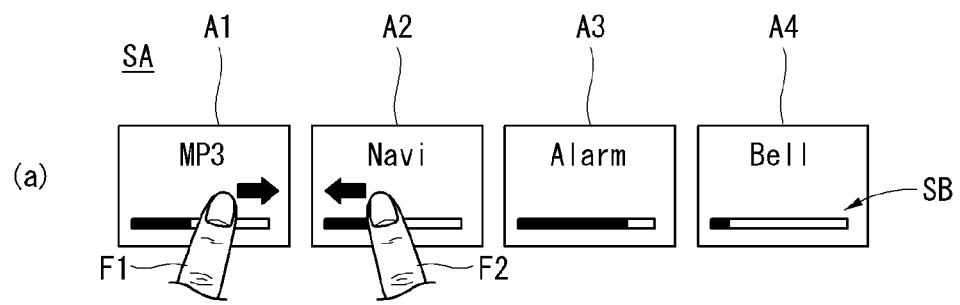
FIGS. 15 to 17 are views showing an operational procedure of a control window for controlling a plurality of sound sources of the mobile terminal of FIG. 9.
Figure 15:
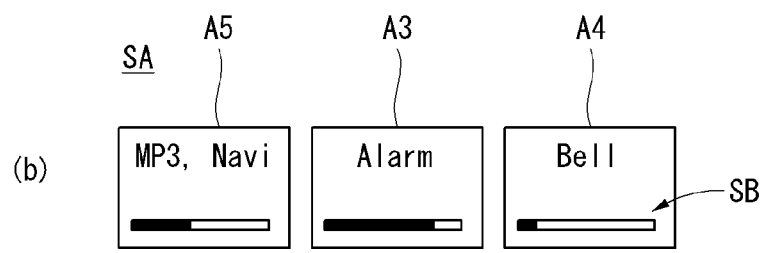
Figure 16:
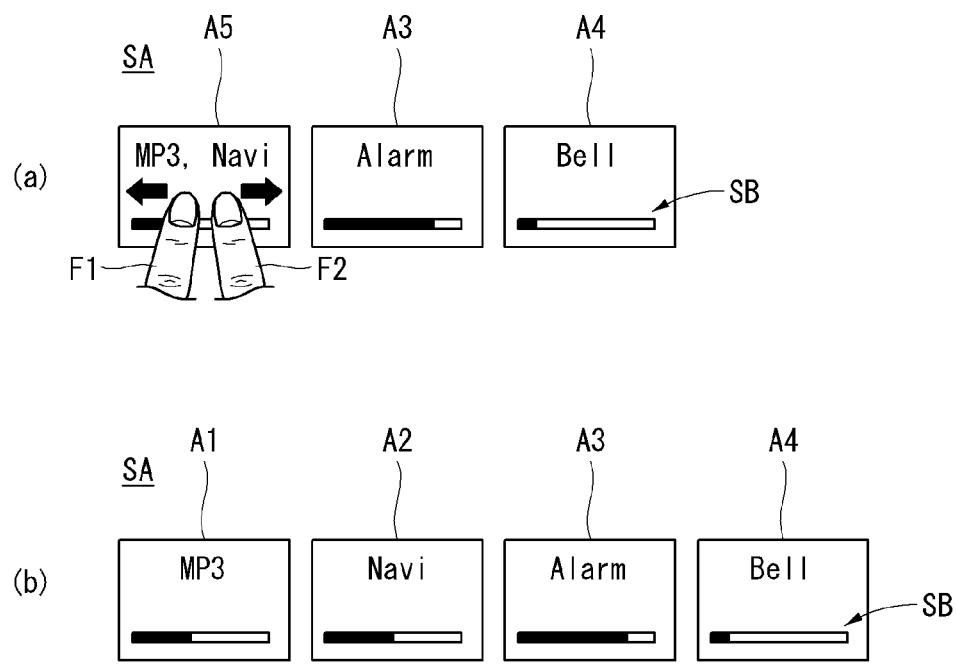
Figure 17:
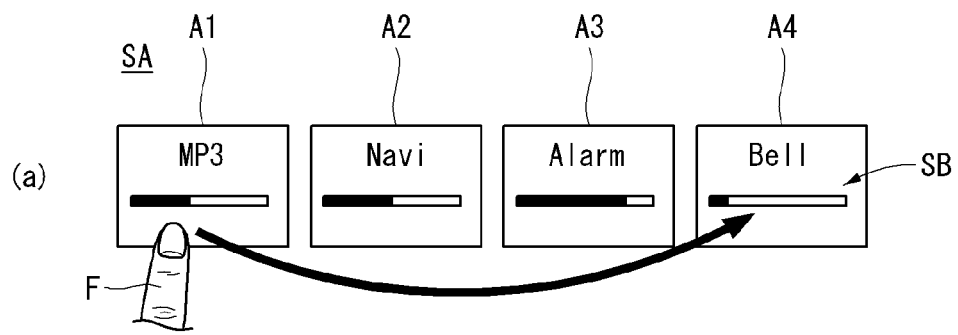
Figure 17:
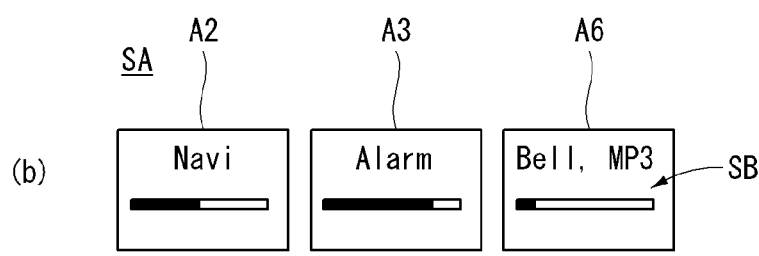

FIGS. 15 to 17 are views showing an operational procedure of a control window for controlling a plurality of sound sources of the mobile terminal of FIG. 9.

As shown in these drawings, the mobile terminal 100 according to example embodiment of the present invention may manipulate the control window SA in various ways.

As shown in (a) of FIG. 15, the user may select a plurality of areas within the control window SA and perform a dragging touch action in a direction that makes them closer. For example, this means that a dragging touch action may be performed in a direction in which a first finger F1 touching the first area A1 and a second finger F2 touching the second area A2 become closer to each other.

As shown in (b) of FIG. 15, the first and second areas A1 and A2 may be combined into a fifth area A5 by a user's dragging touch action. The fifth area A5 may be an area in which volume control on an application corresponding to the first and second areas A1 and A2, which are the areas which exist before the combination. That is, the volumes of MP3 and navigation, which are separately manipulated before the combination, may be simultaneously manipulated by a single operation after the combination. This may be intuitively perceived based on the fact that the volume control bars SB on the corresponding areas are combined as one.

As shown in (a) of FIG. 16, the user may touch the combined fifth area A5 with the first and second fingers F1 and F2 and then perform a dragging touch action in a direction in which the fingers become farther away from each other.

As shown in (b) of FIG. 16, when a dragging touch action is performed in a direction in which the fingers are become farther away from each other in the fifth area A5, the combined fifth area A5 may be separated into the original mode. For example, this means that the volumes of MP3 and navigation may be separately manipulated.

As shown in (a) of FIG. 17, the user may perform a dragging touch action from the first area A1 to the fourth area A4 by using a finger F.

As shown in (b) of FIG. 17, when a dragging touch action from the first area A1 to the fourth area A4 is input, the controller 180 may create a sixth area A6 for controlling the volume of the MP3 application corresponding to the first area A1 and the ringtone volume corresponding to the fourth area A4 at a time. That is, the controller 180 of the mobile terminal 100 according to example embodiment of the present invention may combine separate areas, as well as neighboring areas.

Figure 18:
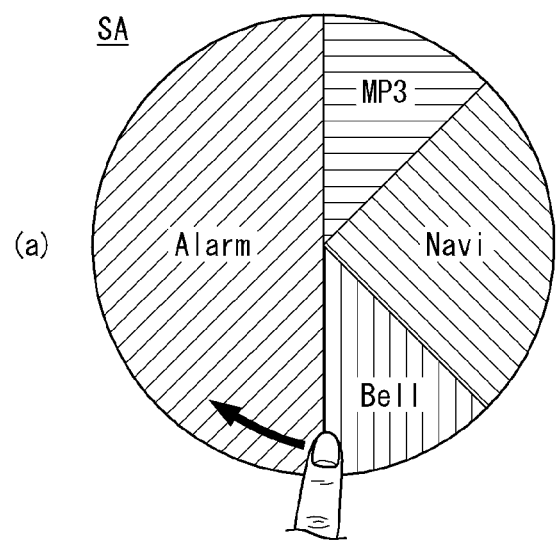
FIGS. 18 and 19 are views showing an operational procedure of a control window according to another embodiment of the present invention.
Figure 18:
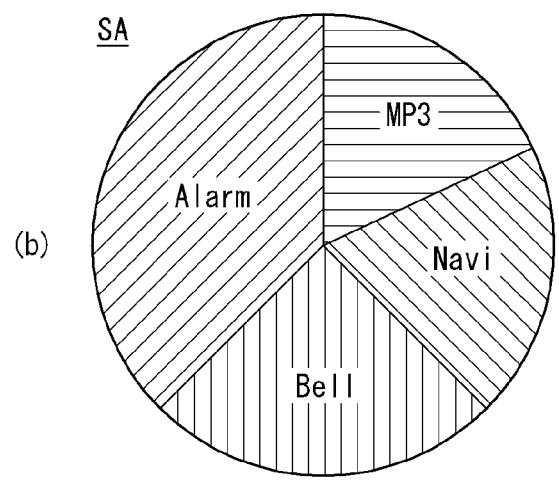
Figure 19:
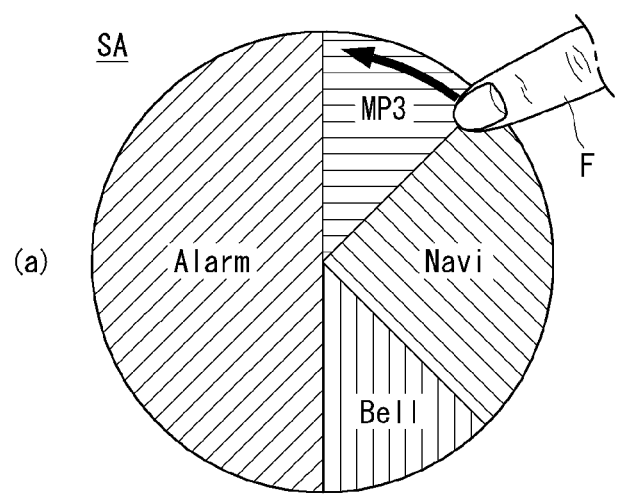
Figure 19:
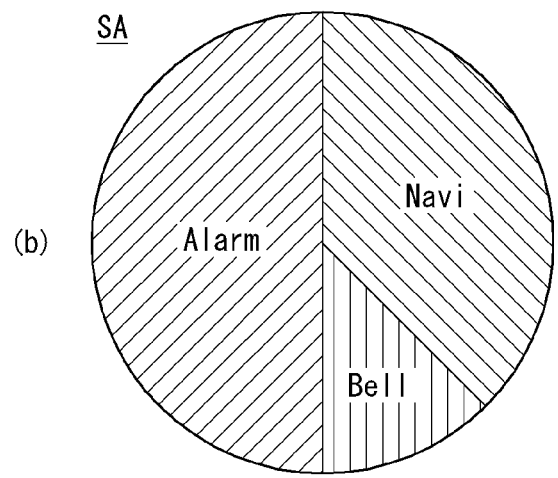

FIGS. 18 and 19 are views showing an operational procedure of a control window according to another embodiment of the present invention.

As shown in these drawings, the controller 180 of the mobile terminal 100 according to another embodiment of the present invention may display the control window SA in various ways.

As shown in (a) of FIG. 18, the control window SA may be displayed in the shape of a round pie. Each area of the control window SA may involve the volume of a specific application. For example, it can be seen that the volume of an alarm is relatively high and the volume of a ringtone or MP3 is relatively low. The user may touch a specific area and drag it clockwise or counterclockwise.

As shown in (b) of FIG. 18, if a specific area is touched and dragged, the controller 180 may change the display of the control window SA so as to correspond to such an operation. The changing of the display of the control window SA indicates that the volume of the corresponding application is controlled corresponding to such a change.

When the display of the control window SA is changed, this may indicate that the ratio of the output of a plurality of sound sources is to be adjusted. For example, this means that, if the overall output of a speaker is 1, the ratio of the output level of an alarm sound source may be adjusted from 0.5 to 0.3. Once the output level ratio or the output ratio is decreased, the relative volume level may be decreased. Once the relative volume level is decreased, the possibility that the user will perceive the sounds when a plurality of sound sources are simultaneously output may be lowered. Accordingly, the user may selectively perceive desired information by increasing or decreasing the output ratio.

As shown in (a) of FIG. 19, a specific area of the control window SA may be touched with the finger F and dragged to a boundary with another area. For example, an operation of touching a boundary with the MP3 area and dragging it to a boundary with the alarm area may be performed.

As shown in (b) of FIG. 19, when an operation of dragging a boundary with a specific area to a boundary with another area is performed, the controller 180 may adjust the volume of a specific application corresponding to the specific area to "0". Also, when the volume of the specific application becomes "0", the controller 180 may terminate the running of the application. For example, by making the area corresponding to MP3 disappear, the volume of MP3 becomes "0", and the MP3 application may be terminated.

Reducing the volume of a specific application to "0" means that the output of a specific sound source is lowered to a threshold value or less. That is, when the volume is adjusted to a predetermined threshold value or less, the running of the corresponding specific application may be terminated.

Figure 20:
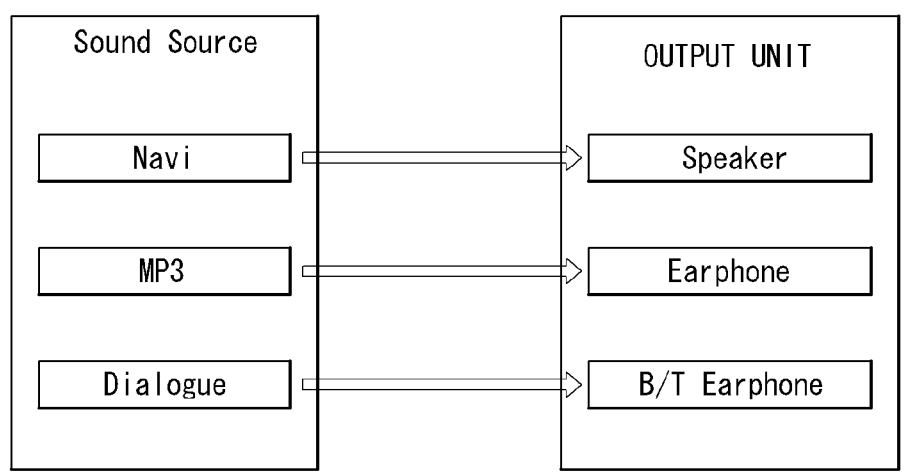
FIGS. 20 and 21 are views showing a control window according to another embodiment of the present invention.
Figure 21:
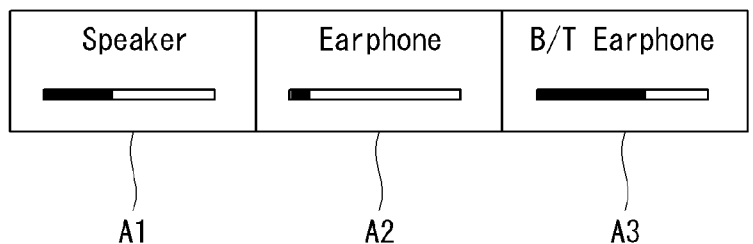

FIGS. 20 and 21 are views showing a control window according to another embodiment of the present invention.

As shown in these drawings, the controller 180 of the mobile terminal 100 according to another embodiment of the present invention may control a specific sound source to correspond to a specific output device.

As shown in FIG. 20, a plurality of sound sources may be stored. For example, there may exist a sound source associated with a navigation application, a sound source associated with an MP3 application, and a sound source associated with a call.

The output unit 150 may include a plurality of output devices. For example, a speaker, an earphone, a Bluetooth earphone, etc may be prepared in the mobile terminal 100.

The controller 180 may control a specific sound source to correspond to a specific output device. For example, the sound source associated with the navigation application may be output through the speaker, the sound source associated with the MP3 application may be output through the earphone, and the sound source associated with a call may be output through the Bluetooth earphone. By outputting a specific sound source to a specific output device, the user may control the output device so as to be optimized for the current environment.

As shown in FIG. 21, if a specific sound source corresponds to a specific output device, the corresponding control window SA may be displayed. For example, this means that the volume of the sound source output through the speaker may be output in the first area A1, the volume of the sound source output through the earphone may be output in the second area A2, and the volume of the sound source output through the Bluetooth earphone may be displayed in the third area A3. The user may control the volumes by touching each area.

FIGS. 22 to 26 are views showing an operation of a mobile terminal according to another embodiment of the present invention.

As shown in these drawings, the controller 180 of the mobile terminal 100 according to example embodiment of the present invention may effectively perform an operation of making a conference call with other terminals 200, 300, and 400.

Figure 22:
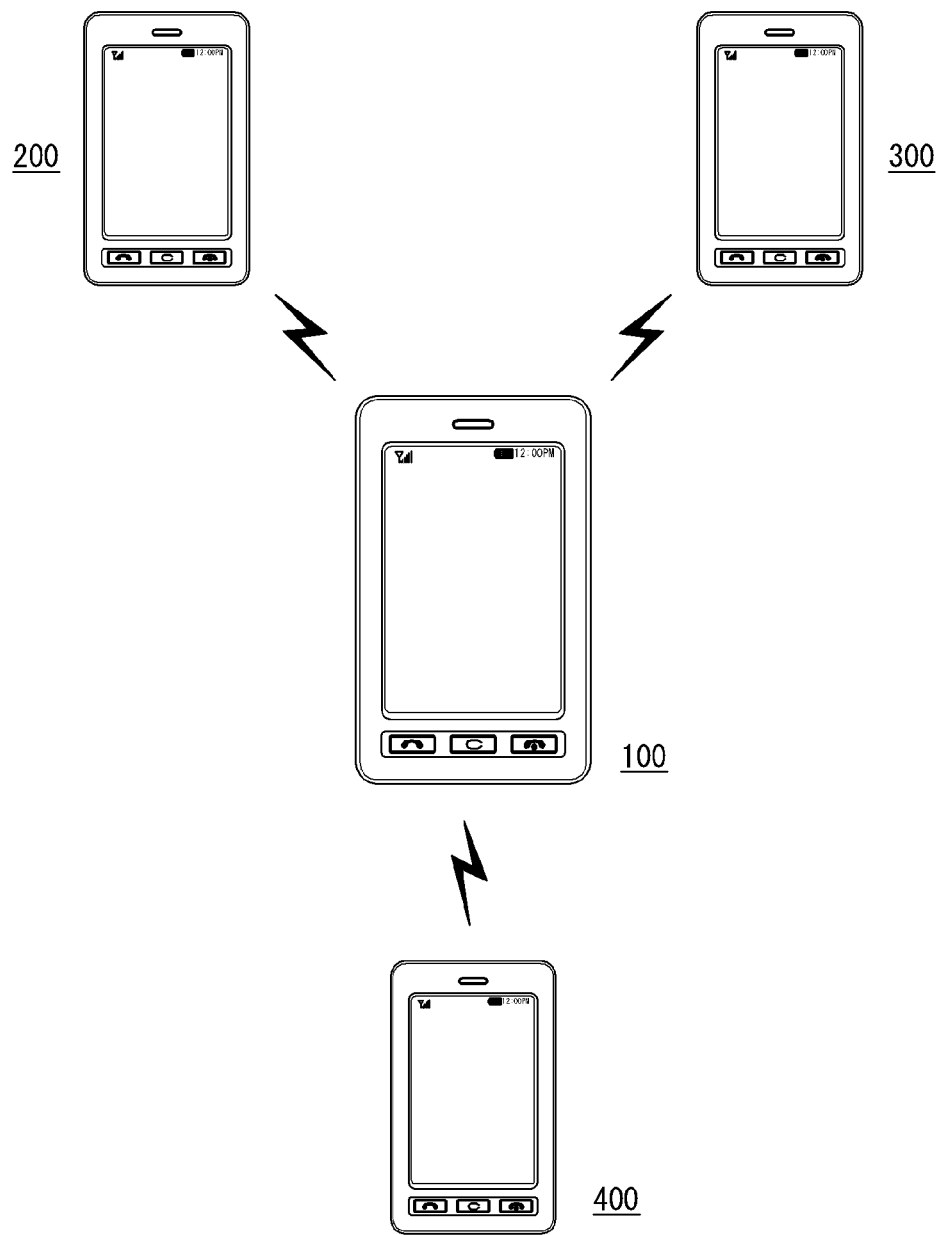
FIGS. 22 to 26 are views showing an operation of a mobile terminal according to another embodiment of the present invention.

As shown in FIG. 22, the mobile terminal 100 may make a call with other terminals 200, 300, and 400. Calls with other terminals 200, 300, and 400 may be made one to one or one to many.

Figure 23:
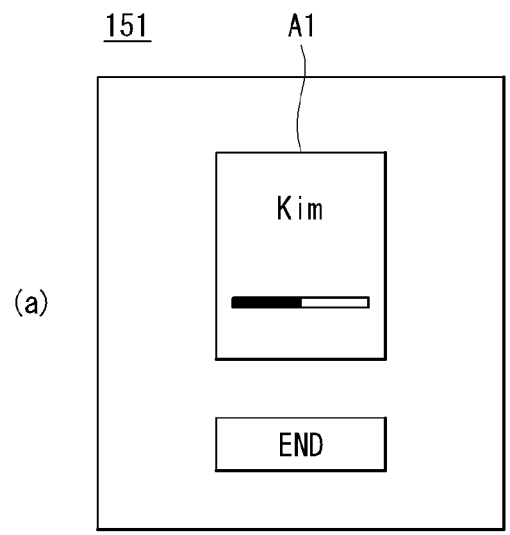
Figure 23:
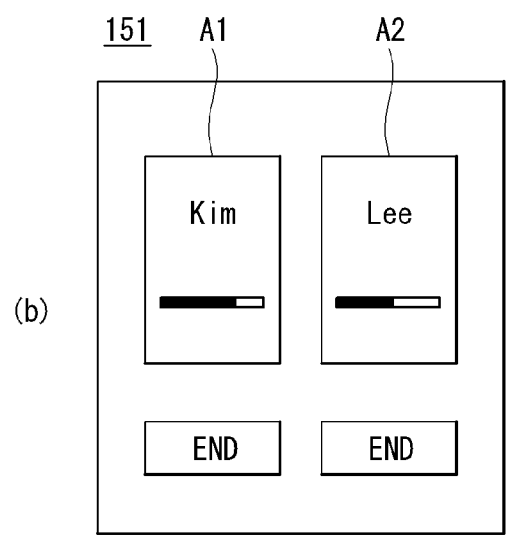

As shown in (a) of FIG. 23, the mobile terminal 100 may be on a call with "Kim", which is one of the other terminals 200, 300, and 400. The controller 180 may display the other party on the line in the first area A1 and/or display the volume of the phone conversation with the other party. The user may adjust the phone conversation volume by touching a phone conversation volume gauge of the first area A1.

As shown in (b) of FIG. 23, a call with "Lee" may be made simultaneously while on the line with "Kim". The controller 180 may display the first area A1 and the second area A2 separately. This may indicate that the call with the other party corresponding to the first area A1 is being made separately from the call with the other party corresponding to the second area A2. That is, a phone conversation between the user of the mobile terminal 100 and "Kim" is not transmitted to "Lee", and vice versa.

Figure 24:
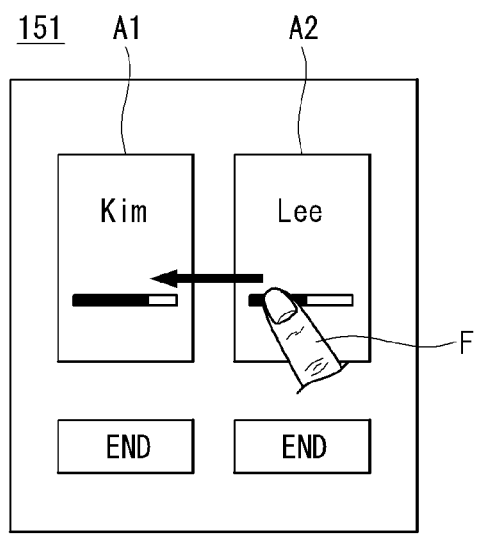
Figure 24:
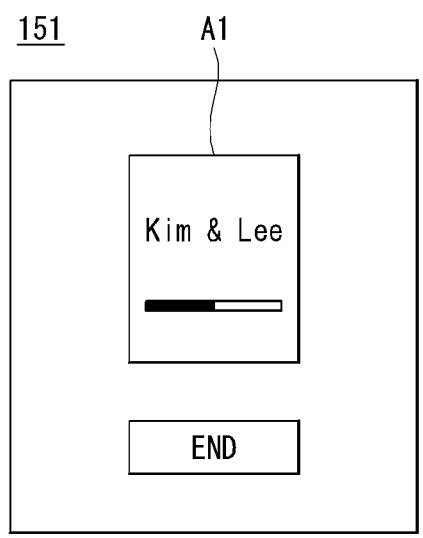

As shown in (a) of FIG. 24, the user may perform a dragging touch action from the second area A2 to the first area A1 with the finger F.

As shown in (b) of FIG. 24, when a user's dragging touch is input, the controller 180 may display "Kim" and "Lee" in one area, i.e., the third area A3. When multiple other parties are displayed in one area, i.e., the third area A3, the user of the mobile terminal 100 may intuitively know that a conference call is being made between the user of the mobile terminal 100, "Kim", and "Lee". An operation of separating the combined third area may be performed. As described above, when the combined area is separated, the conference call may be terminated.

Figure 25:
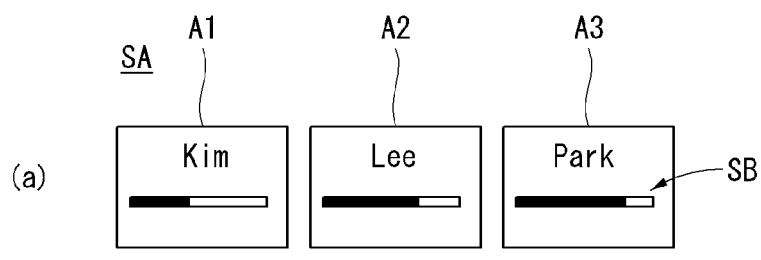
Figure 25:
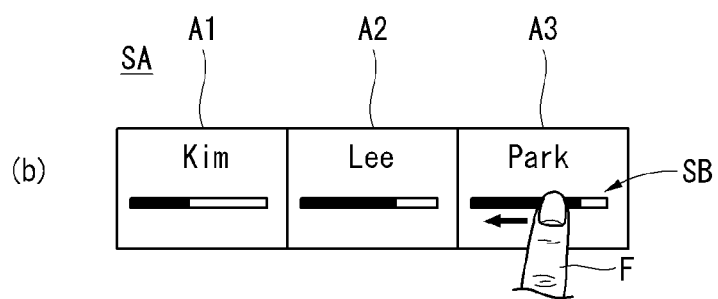

As shown in (a) of FIG. 25, the first to third areas A1, A2, and A3 may be displayed in the control window SA. A volume control bar SB for controlling the volume of a phone conversation with the other party on the line may be displayed in each area.

As shown in (b) of FIG. 25, the user may adjust the volume control bar SB of a specific one of the first to third areas A1, A2, and A3 of the control window SA. When the volume control bar SB of the specific area is adjusted, the volume of the corresponding phone conversation with the other party may be adjusted.

By adjusting the volume control bar SB, the state of a call with a specific person can be adjusted. For example, the user may manipulate the volume control bar SB of the third area A3 with the finger F.

Figure 26:
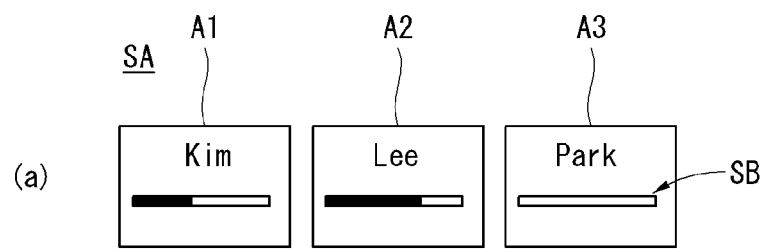
Figure 26:
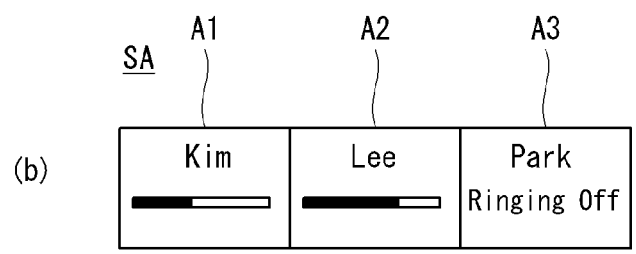

As shown in (a) of FIG. 26, the volume of a phone conversation with "Park" corresponding to the third area A3 may be reduced to "0" by a user operation. That is, the sound of the phone conversation with "Park" may be adjusted to a threshold value or less.

As shown in (b) of FIG. 26, when the volume of a phone conversation with a specific person is reduced to "0", the call with that person may be terminated. This means that the call state may be controlled, without any particular operation, only by adjusting the volume.

FIGS. 27 to 32 are views showing an operation of the mobile terminal which is performed on a three-dimensional equalizer according to one embodiment of the present invention.

As shown in these drawings, the controller 180 of the mobile terminal according to one embodiment of the present invention may control the output of a sound source more effectively by performing an operation on an equalizer displayed in a three-dimensional manner.

A three-dimensional display may include a stereoscopic representation of an image using binocular parallax. The representation of a stereoscopic image using binocular parallax will be described in more detail in the relevant section. Further, although represented in planar view in the drawings due to limitations of representation, at least one object displayed in the drawings may be a representation of a stereoscopic image using binocular parallax.

Figure 27:
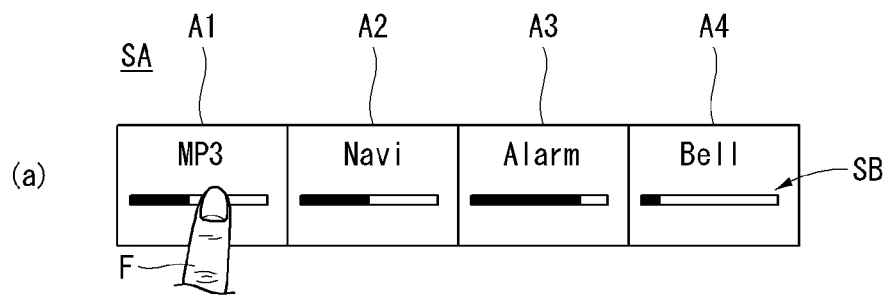
FIGS. 27 to 32 are views showing an operation of the mobile terminal which is performed on a three-dimensional equalizer according to one embodiment of the present invention.
Figure 27:
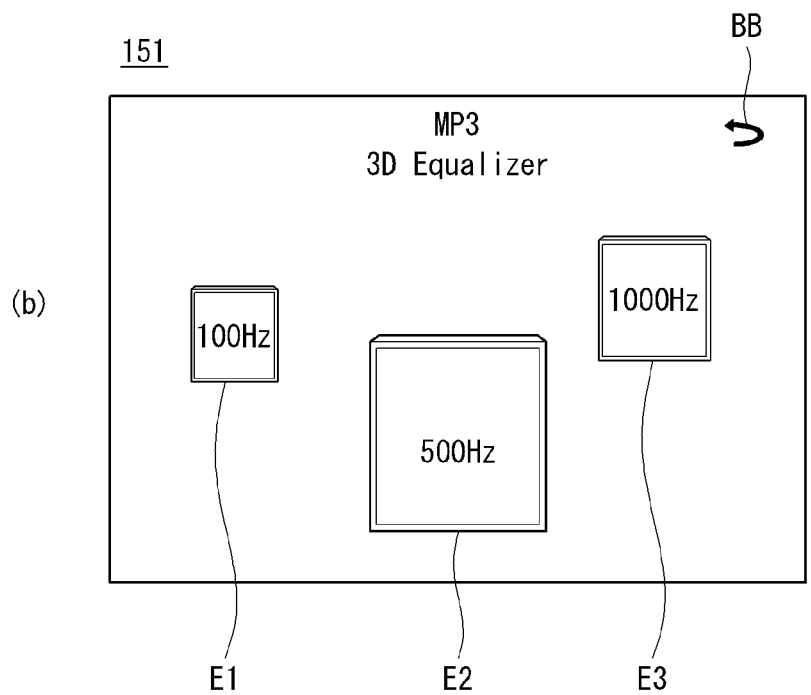

As shown in (a) of FIG. 27, first to fourth A1 to A4 may be displayed in the control window SA. The user may touch a specific one of the first to fourth areas A1 to A4 with the finger F in order to control the output of a sound source more finely. For example, in order to control the output of an MP3 application more finely, the first area A1 corresponding to the output of the MP3 application may be long-touched when the control window SA is on display.

As shown in (b) of FIG. 27, when the first area A1 is long-touched, a three-dimensional equalizer for controlling the output of the corresponding MP3 application may be displayed.

Figure 28:
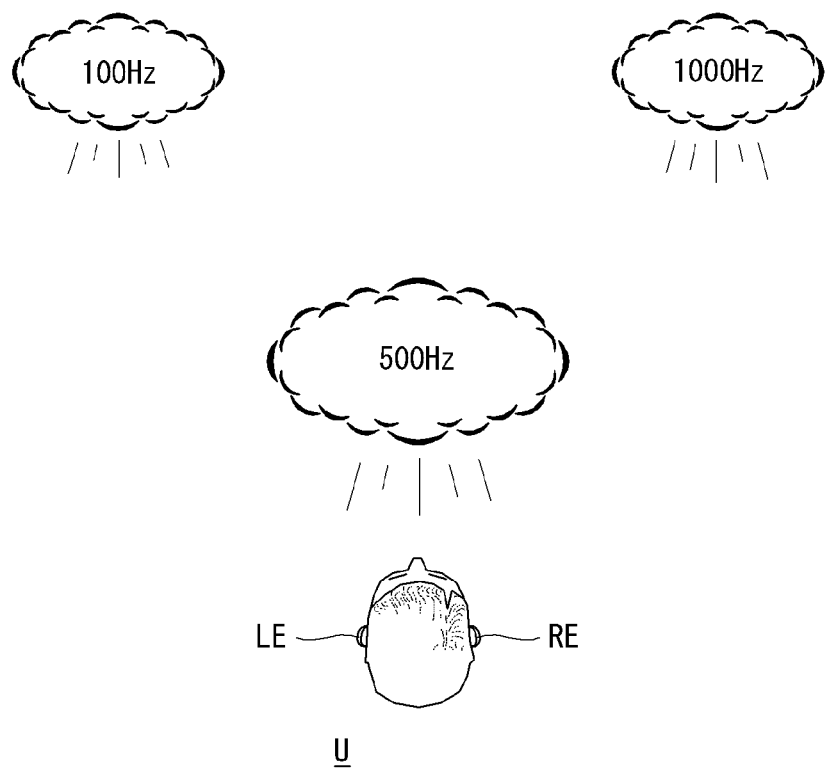

The three-dimensional equalizer may be a screen which visually represents stereo sound, which can be heard by the user's left and right ears (LE and RE of FIG. 28). The three-dimensional equalizer may display a sound closer to the user's left eye (LE of FIG. 28) on the left side and a sound closer to the user's right eye (RE of FIG. 28) on the right side. Further, a sound which sounds as if coming from a relatively long distance is displayed in small size, and a sound which sounds as if coming from a short distance may be displayed in large size. For example, a second stereoscopic icon E2 corresponding to a sound in the 300 Hz range which is relatively loud and sounds as if coming from the front may be displayed at the center. On the other hand, a first stereoscopic icon E1 corresponding to a sound in the 100 Hz range which is relatively quiet and sounds as if coming from the left may be displayed at the left, and a third stereoscopic icon E3 corresponding to a sound in the 1,000 Hz range which is relatively quiet and sounds as if coming from the right may be displayed at the right.

By displaying a stereoscopic icon so as to corresponding to an output format of a sound source, and controlling the displayed stereoscopic icon to change the output format of the sound source, the user may adjust the output more intuitively.

The controller 180 may display a return icon BB for returning to the control window SA. When the user selects the return icon BB, the three-dimensional equalizer may be terminated, and the control window SA may be displayed.

As shown in FIG. 28, sounds of different ranges may be output in accordance with the control of the three-dimensional equalizer, and the user U may perceive sounds of specific ranges more clearly through the left ear and/or the right ear LE and RE.

Figure 29:
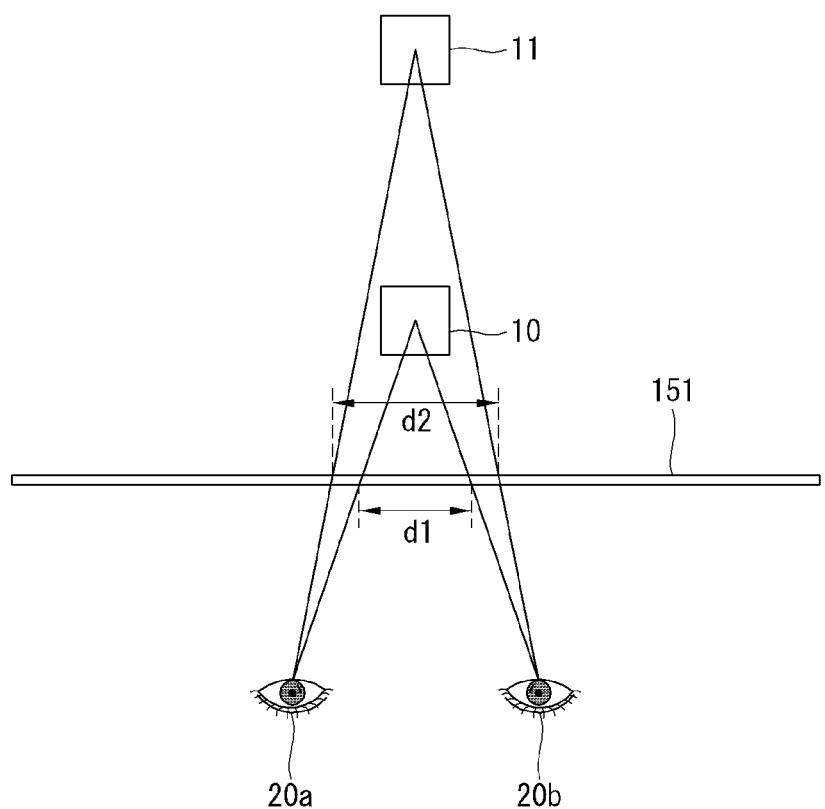

As shown in FIG. 29, an image may be perceived in a three-dimensional manner by using binocular parallax.

A first image object 10 may include a left-eye image 10a that the user see with the left eye 20a and a left-eye image 10b that the user sees with the right eye 20b.

The controller 180 may acquire a first binocular parallax d1 corresponding to the first image object 10 and/or a second binocular parallax d2 corresponding to the second image object 11 through the left-eye image 10a and the right-eye image 10b.

The controller 180 may acquire the binocular parallax of the first image object 10 and the binocular parallax of the second image object 11 by using the left-eye image and the right-eye image, which are generated by an image conversion algorithm.

Figure 30:
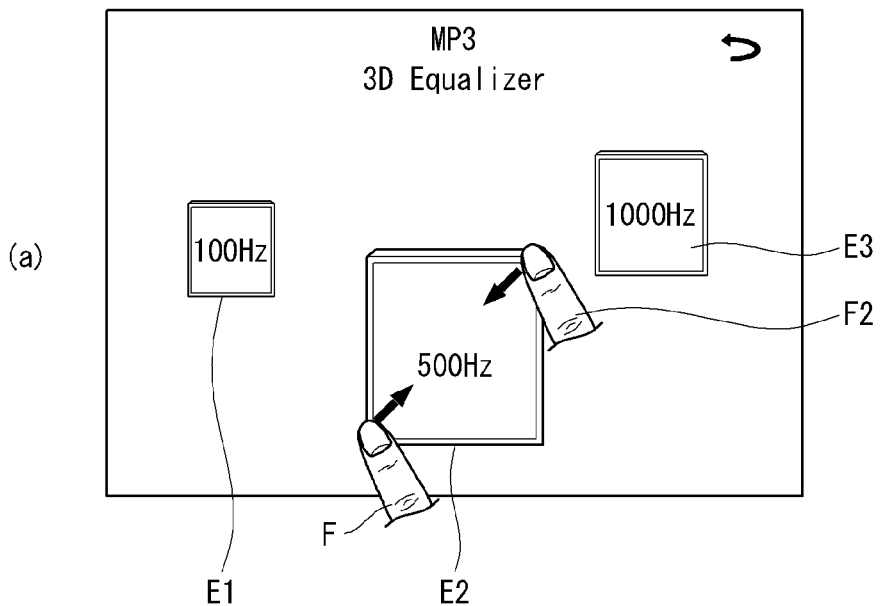
Figure 30:
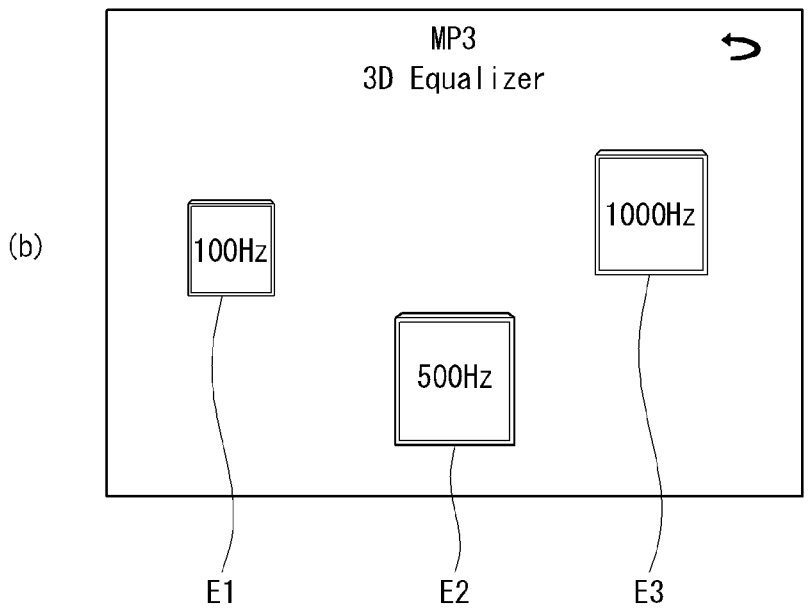

As shown in (a) of FIG. 30, the user may manipulate a specific stereoscopic icon. When the stereoscopic is manipulated, the controller 180 may adjust the output of a sound corresponding to the stereoscopic icon.

The user may adjust the size of the second stereoscopic icon E2 by using first and second fingers E1 and E2. For example, this means that an operation of reducing the size of the second stereoscopic icon E2 may be performed.

As shown in (b) of FIG. 30, the size of the second stereoscopic icon E2 may be reduced by a user manipulation.

Figure 31:
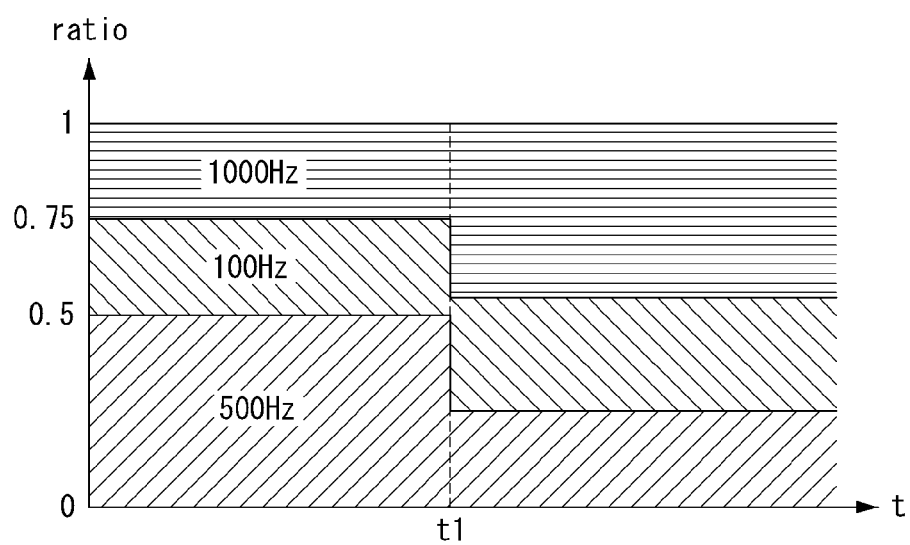

As shown in FIG. 31, when the size of the second stereoscopic icon E2 is reduced, the output of the corresponding sound in the 500 Hz range may be decreased. For example, this means that the sound in the 500 Hz range, which is output at a ratio of 0.5 before time t1, may be reduced to correspond to the reduction in size of the second stereoscopic icon E2. At this point, the controller 180 may increase the output of sounds of different ranges at a relatively constant rate.

Figure 32:
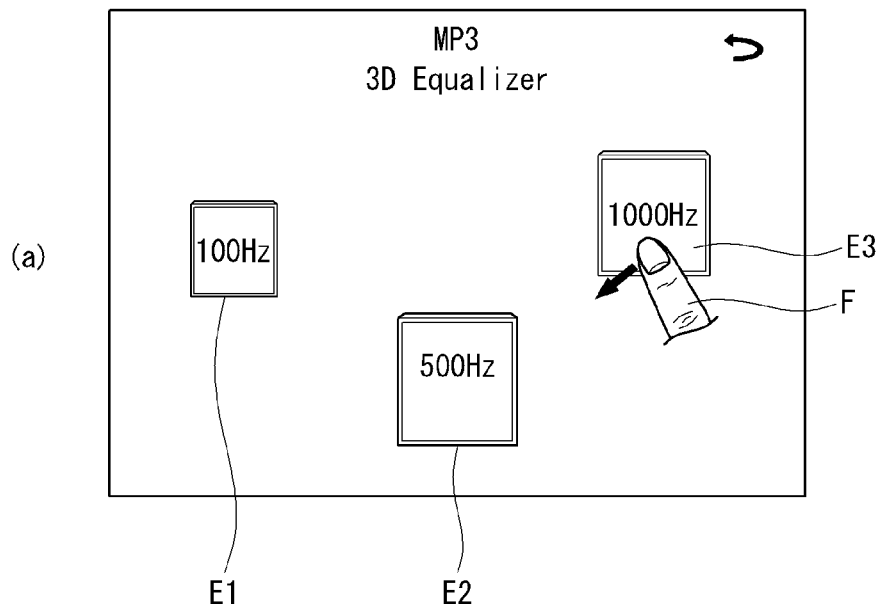
Figure 32:
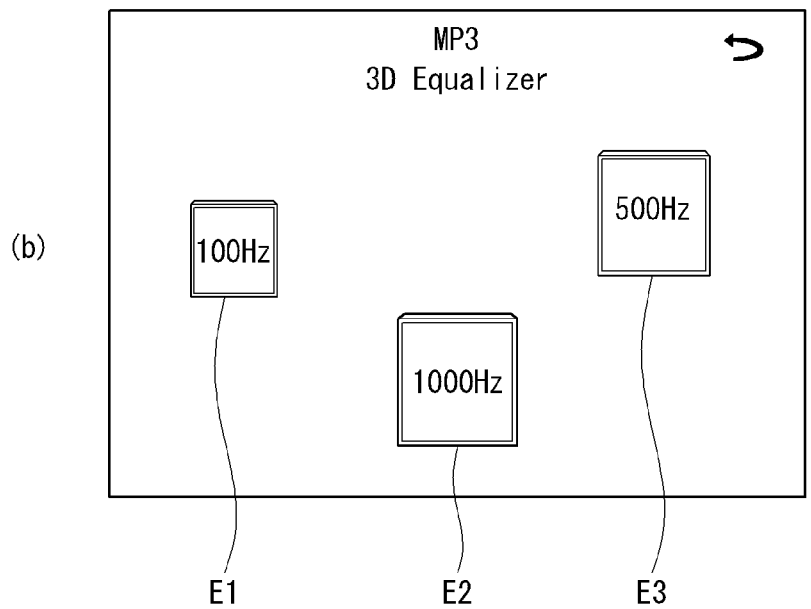

As shown in (a) of FIG. 32, the user may change the position of a specific stereoscopic icon by using the finger F or the like. For example, the user may perform an operation of touching the third stereoscopic icon E3 and dragging it in the direction of the second stereoscopic icon E2.

As shown in (b) of FIG. 32, the position of the third stereoscopic icon E3 corresponding to the 1,000 Hz range and the position of the third stereoscopic icon E2 corresponding to the 500 Hz range may be switched by a user's dragging touch action. Once the positions of the stereoscopic icons are switched, the controller 180 may control the output of the sound of each range so as to correspond to the switch in position. For example, this means that, while the sound in the 1,000 Hz range sounds as if coming from the right before the switch in the positions of the stereoscopic icons, the sound in the 500 Hz range sounds as if coming from the right after the switch in the positions of the stereoscopic icons. Also, this means that, while the sound in the 500 Hz range sounds as if coming from a short distance before the switch in the positions of the stereoscopic icons, the sound in the 1,000 Hz range sounds as if coming from a long distance after the switch in the positions of the stereoscopic icons.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a memory configured to store a plurality of sound sources;
a display;
an output unit comprising an audio output module; and
a controller configured to:
cause the display to display an equalizer screen comprising at least one stereoscopic icon three-dimensionally representing an output format of a sound source of the plurality of sound sources;
change the output format of the sound source in response to manipulation of the displayed at least one stereoscopic icon;
control output of the sound source according to the changed output format, wherein the output format comprises a volume or an emission direction of a sound at each of different frequency ranges;
control the emission direction of the sound at each of the different frequency ranges depending on change of the position of the stereoscopic icon; and
wherein the stereoscopic icon represents a volume level of a sound of each frequency range, and wherein a position of the stereoscopic icon represents an emission direction of a sound at each of the different frequency ranges.

2. The mobile terminal of claim 1, wherein the controller is further configured to:
cause the display to display a control window for acquiring a user input to control the output of the sound source.

3. The mobile terminal of claim 2, wherein the control window is divided into a plurality of areas to correspond to the plurality of sound sources, and when a plurality of touches on at least two of the plurality of areas are dragged in a direction in which the touches become closer to each other, combine the at least two areas corresponding to the plurality of touches together.

4. The mobile terminal of claim 3, wherein, when the at least two areas are combined together, the controller performs control on the plurality of sound sources corresponding to the plurality of areas based on a manipulation on the combined area.

5. The mobile terminal of claim 3, wherein, when the plurality of touches on the displayed combined area are dragged in a direction in which the touches are separated from each other, the controller separates the combined area and displays the same in separate areas.

6. The mobile terminal of claim 2, wherein the controller adjusts the ratio of the output of each of the plurality of sound sources based on the acquired input.

7. The mobile terminal of claim 1, wherein the control window is divided into a plurality of areas to correspond to the plurality of sound sources, and wherein the controller is further configured to cause the display to display a volume control bar that acquires a user input for controlling the output of the plurality of sound sources.

8. The mobile terminal of claim 1, wherein, when the output of a specific sound source of the sound sources is adjusted to a threshold value or less, the controller terminates running of an application corresponding to the specific sound source.

9. The mobile terminal of claim 1, wherein the audio output module comprises a plurality of output devices, and
the controller outputs the plurality of sound sources to the plurality of output devices in a distributed fashion.

10. The mobile terminal of claim 1, wherein the plurality of sound sources are the sounds of phone conversations with the users of a plurality of other devices, and when the output of at least one of the sounds of phone conversations is controlled to a threshold value or less, the controller terminates the call with the users of other devices corresponding to the phone conversation sound adjusted to the threshold value or less.

11. The mobile terminal of claim 1, wherein the plurality of sound sources comprise at least either one of a content sound source associated with an operation of at least one specific application or a system source associated with an operation of the mobile terminal.

12. The mobile terminal of claim 1, further comprising a wireless communication unit,
wherein at least one of the plurality of sound sources is acquired in a streaming fashion through the wireless communication unit.

13. The mobile terminal of claim 1, wherein the controller controls the volume of the sound at each of the different frequency ranges depending on change of the size of the stereoscopic icon.

14. A mobile terminal comprising:
a memory configured to store a plurality of sound sources;
a display;
an output unit comprising a display and an audio output module; and
a controller configured to:
cause the display to display an equalizer screen comprising at least one stereoscopic icon three-dimensionally representing an output format of the sound source if a specific event occurs while an image associated with a sound source of the plurality of sound sources is displayed;
change the output format of the sound source in response to manipulation of the displayed at least one stereoscopic icon;
control output of the sound source according to the changed output format, wherein the output format comprises a volume or an emission direction of a sound at each of different frequency ranges;
control the emission direction of the sound at each of the different frequency ranges depending on change of the position of the stereoscopic icon; and
wherein the stereoscopic icon represents a volume level of a sound of each frequency range, and
wherein a position of the stereoscopic icon represents an emission direction of a sound at each of the different frequency ranges.

15. A mobile terminal comprising:
an output unit;
a display;
a memory configured to store a plurality of sound sources; and
a controller configured to:
give priority to a specific one of the plurality of sound sources;
cause the display to display an equalizer screen comprising at least one stereoscopic icon three-dimensionally representing an output format of the sound source, wherein the equalizer screen is for receiving a user input to control output of another one of the plurality of sound sources if a specific event is acquired while priority is given to the specific one of the plurality of sound sources;
change the output format of the sound source in response to manipulation of the displayed at least one stereoscopic icon;
control output of the sound source according to the changed output format, wherein the output format comprises a volume or an emission direction of a sound at each of different frequency ranges;
control the emission direction of the sound at each of the different frequency ranges depending on change of the position of the stereoscopic icon; and
wherein the stereoscopic icon represents a volume level of a sound of each frequency range, and
wherein a position of the stereoscopic icon represents an emission direction of a sound at each of the different frequency ranges.

16. A control method of a mobile terminal comprising:
storing a plurality of sound sources;
displaying, on a display of the mobile terminal, an equalizer screen comprising at least one stereoscopic icon three-dimensionally representing an output format of a sound source of the plurality of sound sources;
changing the output format of the sound source in response to manipulation of the displayed at least one stereoscopic icon;
control output of the sound source according to the changed output format, wherein the output format comprises a volume or an emission direction of a sound at each of different frequency ranges;

control the emission direction of the sound at each of the different frequency ranges depending on change of the position of the stereoscopic icon; and wherein the stereoscopic icon represents a volume level of a sound of each frequency range, and wherein a position of the stereoscopic icon represents an emission direction of a sound at each of the different frequency ranges.

17. The method of claim 16, wherein, when output of a specific sound source of the sound sources is adjusted to a threshold value or less, the method further comprises terminating running of an application corresponding to the specific sound source.

18. The method of claim 16, wherein the controller is further configured to:

cause the display to display a control window for acquiring a user input to control the output of the sound source.

19. The method of claim 16, wherein the control window is divided into a plurality of areas to correspond to the plurality of sound sources, and wherein the controller is further configured to cause the display to display a volume control bar that acquires a user input for controlling the output of the plurality of sound sources.

* * * * *